US010747445B2

(12) United States Patent
Kikuchi et al.

(10) Patent No.: US 10,747,445 B2
(45) Date of Patent: Aug. 18, 2020

(54) MEMORY SYSTEM THAT SELECTS DATA TO BE TRANSMITTED FROM A DATA BUFFER THROUGH A PORT

(71) Applicant: TOSHIBA MEMORY CORPORATION, Tokyo (JP)

(72) Inventors: Takeshi Kikuchi, Isehara Kanagawa (JP); Kazuhito Okita, Ota Tokyo (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 131 days.

(21) Appl. No.: 15/063,120

(22) Filed: Mar. 7, 2016

(65) Prior Publication Data
US 2017/0083248 A1 Mar. 23, 2017

Related U.S. Application Data

(60) Provisional application No. 62/221,848, filed on Sep. 22, 2015.

(51) Int. Cl.
G06F 3/06 (2006.01)
G06F 13/42 (2006.01)
G06F 13/16 (2006.01)

(52) U.S. Cl.
CPC .......... G06F 3/0613 (2013.01); G06F 3/0656 (2013.01); G06F 3/0679 (2013.01); G06F 13/1673 (2013.01); G06F 13/4282 (2013.01); G06F 2213/0028 (2013.01); G06F 2213/4004 (2013.01); Y02D 10/14 (2018.01)

(58) Field of Classification Search
CPC .... G06F 3/0613; G06F 3/0656; G06F 3/0688; G06F 13/4282; G06F 2213/0028; G06F 2213/4004
See application file for complete search history.

(56) References Cited

U.S. PATENT DOCUMENTS

| 7,643,493 | B1* | 1/2010 | Sayrafian-Pour | H04L 49/254 370/231 |
| 7,689,744 | B1* | 3/2010 | McCarty | G06F 13/4045 710/65 |
| 7,739,432 | B1* | 6/2010 | Shaw | G06F 13/4022 360/44 |
| 8,156,270 | B2* | 4/2012 | Nemazie | G06F 13/4022 370/229 |
| 9,172,655 | B1* | 10/2015 | Dropps | H04L 47/6215 |

(Continued)

FOREIGN PATENT DOCUMENTS

| JP | 2005-182128 | 7/2005 |
| WO | WO-2015178926 A1 * | 11/2015 ......... G06F 12/0862 |

Primary Examiner — Tim T Vo
Assistant Examiner — Harry Z Wang
(74) Attorney, Agent, or Firm — Kim & Stewart LLP

(57) ABSTRACT

A memory system includes a non-volatile memory, a data buffer in which data read out from the nonvolatile memory are stored prior to transmission to an initiator that is requesting the data, a port through which the initiator sends a request for the data and through which the data in the data buffer are transmitted to the initiator. When the port is connected to a first initiator at a time both first data requested by the first initiator and second data requested by a second initiator are stored in the data buffer and the second data become ready for transmission prior to the first data, the second data are transmitted through the port prior to the first data.

9 Claims, 17 Drawing Sheets

(56) References Cited

U.S. PATENT DOCUMENTS

| | | | |
|---|---|---|---|
| 9,898,205 B1* | 2/2018 | Kaliannan | G06F 3/0611 |
| 2005/0044287 A1 | 2/2005 | Nishizono et al. | |
| 2006/0206638 A1 | 9/2006 | Shiraki et al. | |
| 2006/0230189 A1* | 10/2006 | Sahara | G06F 9/5083 |
| | | | 710/8 |
| 2008/0005490 A1* | 1/2008 | Shiraki | G06F 3/0611 |
| | | | 711/147 |
| 2008/0228960 A1 | 9/2008 | Nakatsuka | |
| 2009/0147796 A1* | 6/2009 | Chow | H04L 47/6215 |
| | | | 370/413 |
| 2013/0097378 A1 | 4/2013 | Taguchi et al. | |
| 2014/0164670 A1* | 6/2014 | Voorhees | G06F 13/4022 |
| | | | 710/316 |
| 2015/0355841 A1 | 12/2015 | Okita | |
| 2016/0191420 A1* | 6/2016 | Nagarajan | H04L 45/7453 |
| | | | 370/389 |
| 2017/0039002 A1 | 2/2017 | Myouga | |
| 2017/0052736 A1* | 2/2017 | Butt | G06F 12/0862 |

* cited by examiner

FIG. 3

| Byte/Bit | 7 | 6 | 5 | 4 | 3 | 2 | 1 | 0 |
|---|---|---|---|---|---|---|---|---|
| 0 | INIT | PROTOCOL | | | ADDRESS FRAME TYPE (1h) | | | |
| 1 | FEATURES | | | | CONNECTION RATE | | | |
| 2 | INITIATOR CONNECTION TAG | | | | | | | |
| 3 | | | | | | | | |
| 4 | DESTINATION SAS ADDRESS | | | | | | | |
| ... | | | | | | | | |
| 11 | | | | | | | | |
| 12 | SOURCE SAS ADDRESS | | | | | | | |
| ... | | | | | | | | |
| 19 | | | | | | | | |
| 20 | SOURCE ZONE GROUP | | | | | | | |
| 21 | PATHWAY BLOCKED COUNT | | | | | | | |
| 22 | ARBITRATION WAIT TIME (AWT) | | | | | | | |
| 23 | | | | | | | | |
| 24 | MORE COMPATIBLE FEATURES (00000000h) | | | | | | | |
| ... | | | | | | | | |
| 27 | | | | | | | | |
| 28 | CRC | | | | | | | |
| ... | | | | | | | | |
| 31 | | | | | | | | |

| | Valid | COMMAND TAG | START LBA | TOTAL TRANSMISSION NUMBER | CLUSTER NUMBER | PORT NUMBER | INITIATOR INFORMATION | DATA TAGS | TRANSMITTABLE DATA NUMBER INFORMATION | Last |
|---|---|---|---|---|---|---|---|---|---|---|
| ENTRY0 | 1 | TAG 0 | 0x0000 | 20 SECTOR | 4 CLUSTER | PORT 0 | INITIATOR A | 0,···, x−1 | 20 SECTOR | 1 |
| ENTRY1 | 1 | TAG 1 | 0x1011 | 24 SECTOR | 4 CLUSTER | PORT 1 | INITIATOR B | x,···, 2x−1 | 10 SECTOR | 0 |
| ENTRY2 | 1 | TAG 2 | 0x1101 | 24 SECTOR | 4 CLUSTER | PORT 2 | INITIATOR D | 2x,···, 3x−1 | 5 SECTOR | 0 |
| ··· | ··· | ··· | ··· | ··· | ··· | ··· | ··· | ··· | ··· | ··· |
| ENTRYn | 0 | | | | | | | | | |

# MEMORY SYSTEM THAT SELECTS DATA TO BE TRANSMITTED FROM A DATA BUFFER THROUGH A PORT

CROSS-REFERENCE TO RELATED APPLICATION

This application is based upon and claims the benefit of priority from U.S. Provisional Patent Application No. 62/221,848, filed on Sep. 22, 2015, the entire contents of which are incorporated herein by reference.

FIELD

Embodiments described herein relate generally to a memory system, in particular, a memory system that selects data to be transmitted from a data buffer through a port.

BACKGROUND

A memory system of one type includes non-volatile memories and communicates with a computer through a SAS (Serial Attached SCSI) interface. Hereinafter, the computer which can communicate with the memory system is called an initiator. When the SAS interface is used, a communication path between the memory system and the initiator is established by an OPEN sequence. In this case, if the memory system receives a read command which instructs readout of data, the memory system buffers the data in a data buffer, and transmits the data buffered in the data buffer to the initiator.

However, if a connection with the initiator is not established in spite of performing the OPEN sequence, the conventional memory system repeatedly performs the OPEN sequence. For that reason, data transmission efficiency of the conventional memory system may be poor.

BRIEF DESCRIPTION OF THE DRAWINGS

FIG. 3 illustrates an OPEN Address Frame according to the first embodiment.

FIG. 4 illustrates a transmission data management table TB1 according to the first embodiment.

DETAILED DESCRIPTION

Figure 1:
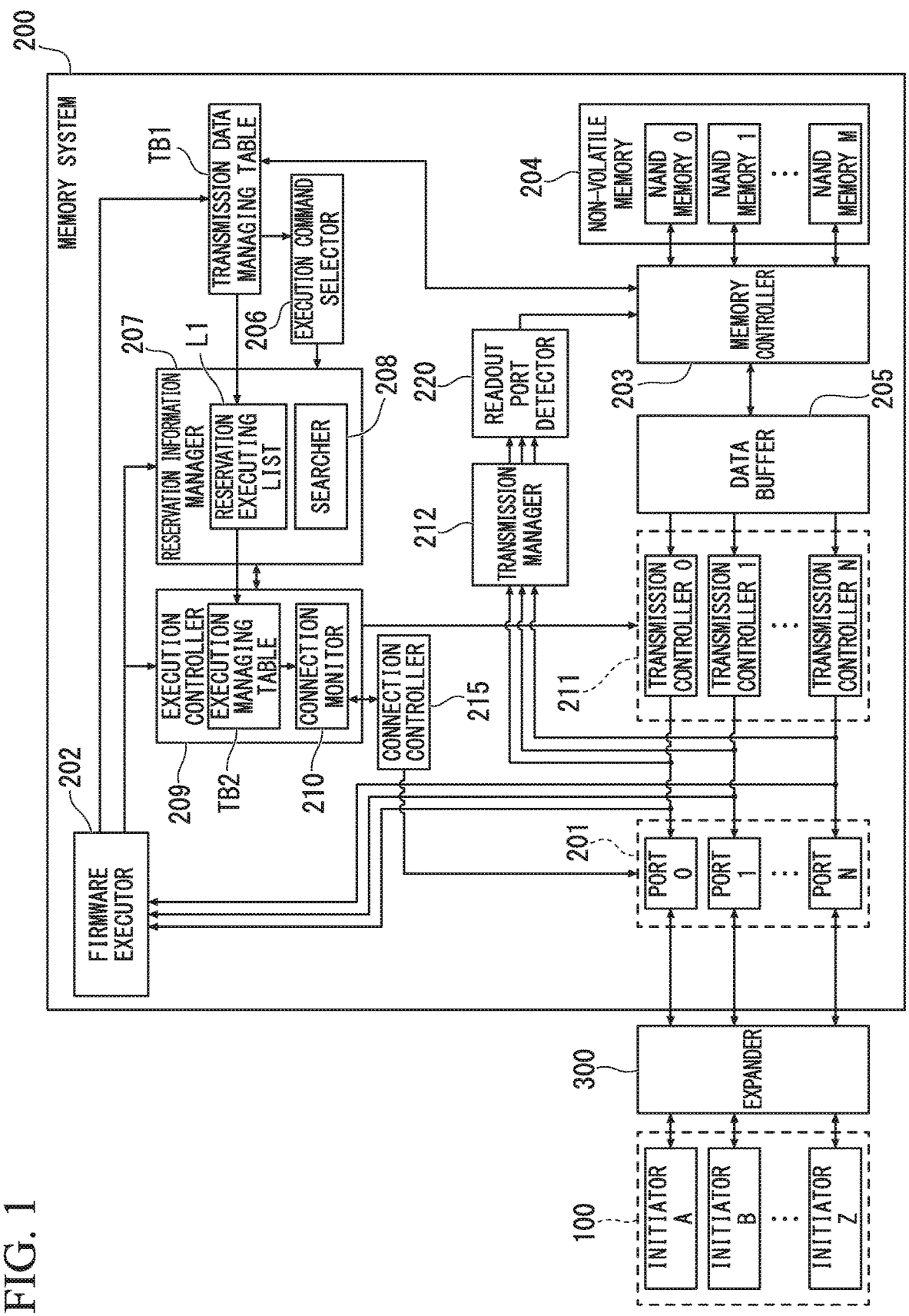
FIG. 1 is a block diagram of a memory system according to a first embodiment.

According to an embodiment, a memory system includes a non-volatile memory, a data buffer in which data read out from the nonvolatile memory are stored prior to transmission to an initiator that is requesting the data, a port through which the initiator sends a request for the data and through which the data in the data buffer are transmitted to the initiator. When the port is connected to a first initiator at a time both first data requested by the first initiator and second data requested by a second initiator are stored in the data buffer and the second data become ready for transmission prior to the first data, the second data are transmitted through the port prior to the first data.

One or more embodiments of a memory system will be described below, with references to the drawings. In the drawings, same elements are depicted with same reference numerals.

First Embodiment

FIG. 1 is a block diagram of a memory system 200 according to a first embodiment. For example, the memory system 200 may be an SSD (Solid State Drive), but not limited thereto.

An expander 300 is connected between an initiator 100 and the memory system 200. For example, the initiator 100 is a computer which can be connected to the memory system 200. The initiator 100 includes a plurality of initiators A to Z. Each of the initiators A to Z is a client (host) which uses the memory system 200 as storage for data. For example, the memory system 200 communicates with the initiators A to Z via the SAS (Serial Attached SCSI) interface. The memory system 200 includes an execution principal, which functions as a target in the SAS standard, with respect to a plurality of ports. The expander 300 is a device that facilitates communication between the initiator 100 and the memory system 200. In particular, the expander 300 is a SAS expander that enables connections between multiple initiator ports and multiple memory system 200 ports by routing connections between the expander ports.

The memory system 200 includes a port 201, a firmware executor 202, a memory controller 203, a non-volatile memory 204, a data buffer 205, an execution command selector 206, a reservation information manager 207, an execution controller 209, a transmission controller 211, a transmission manager 212, and a readout port detector 220.

The port 201 receives a read command from the initiator 100. The port 201 represents a plurality of ports 0 to N, each of which are separately connectable to a plurality of initiators A to Z. For example, the firmware executor 202 is implemented by a processor such as a CPU (Central Processing Unit) executing firmware (program) stored in program memory. The firmware executor 202 interprets a read command received by the port 201. Also, the firmware executor 202 writes the command into a transmission data management table TB1, which is described below.

The non-volatile memory 204 includes a plurality of NAND flash memories 0 to M, but not limited thereto. For example, the non-volatile memory 204 may include only one NAND flash memory. Also, the non-volatile memory 204 is not limited to the NAND flash memory. For example, the non-volatile memory 204 may be a Bit-Cost Scalable memory (BiCS), a Magnetoresistive Random Access Memory (MRAM), a Phase Change Random Access Memory (PcRAM), a Resistance Random Access Memory (RRAM (registered trademark)), or a combination thereof. The memory controller 203 reads data out of the non-volatile memory 204. Thereafter, the memory controller 203 stores the data read out of the non-volatile memory 204, into the data buffer 205 in accordance with a command from the initiators A to Z. The data buffer 205 temporarily stores the data read by the memory controller 203. For example, the data buffer 205 may be DRAM (Dynamic Random Access Memory), SRAM (Static Random Access Memory), FeRAM (Ferroelectric Random Access Memory), MRAM (Magnetoresistive Random Access Memory), PRAM (Phase Change Random Access Memory), or ReRAM (Resistance Random Access Memory). The transmission controller 211 transmits the data stored in the data buffer 205 via the port 201.

When the initiator 100 and the memory system 200 start a communication in conformity with the SAS protocol, it is necessary that the initiator 100 and the memory system 200 perform an OPEN sequence, and the initiator 100 and the memory system 200 become a connected state.

Figure 2:
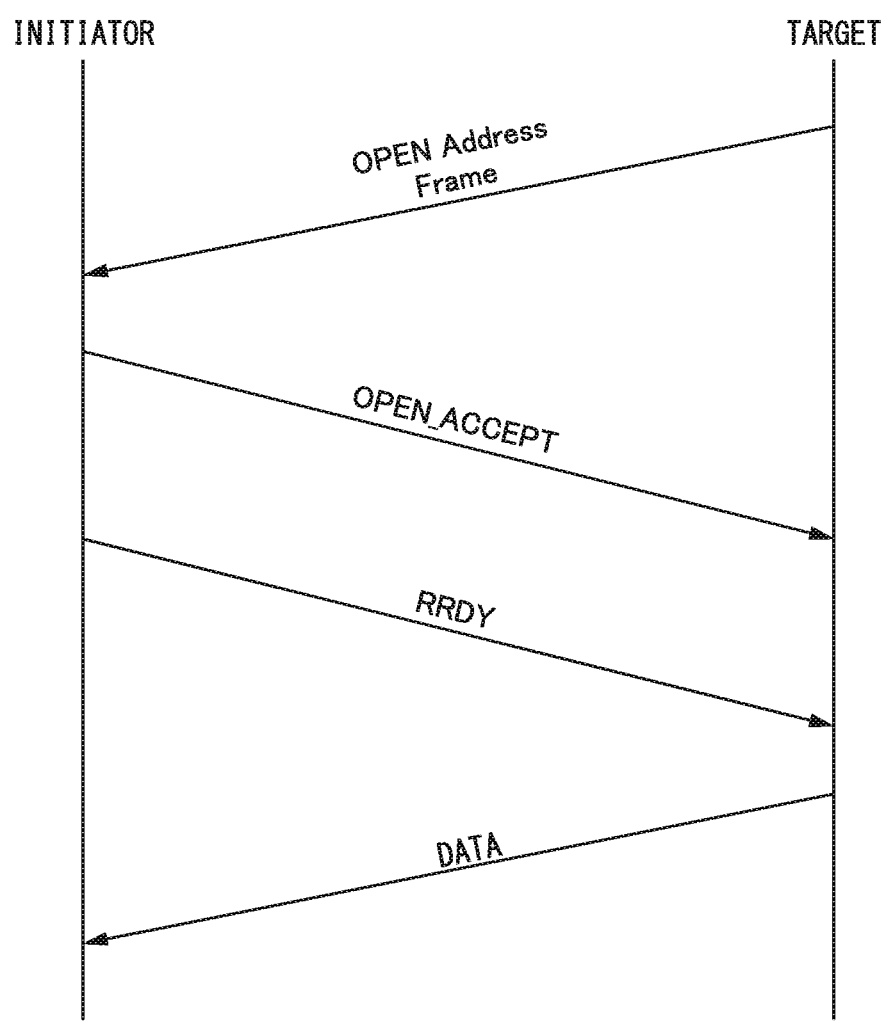
FIG. 2 illustrates an OPEN sequence carried out in the first embodiment.

FIG. 2 illustrates an OPEN sequence according to the first embodiment. For example, a target in the memory system 200, which is a transmission source of the data, transmits an OPEN Address Frame as a connection request in order to start the OPEN sequence. The initiator determines, based on the OPEN Address Frame, whether to accept or reject the connection request. In FIG. 2, the initiator transmits the OPEN_ACCEPT signal which represents acceptance. When the target receives the OPEN_ACCEPT signal from the initiator, the target and the initiator become a connected state. Further, when the target receives the RRDY signal from the initiator, the target can transmit data to the initiator.

Both the target and the initiator can transmit the connection request. In other words, both the target and the initiator can become a transmission source of the connection request. Therefore, for example, if the port 0 of the target and the initiator A are in a connected state, if the initiator B issues the connection request to the port 1 of the target, the port 1 of the target may be connected to the initiator B.

FIG. 3 illustrates an OPEN Address Frame in the first embodiment. The OPEN Address Frame includes fields of "INIT", "PROTOCOL", "ADDRESS FRAME TYPE", "FEATURES", "CONNECTION RATE", "INITIATOR CONNECTION TAG", "DESTINATION SAS ADDRESS", "SOURCE SAS ADDRESS", "COMPATIBLE FEATURES", "PATHWAY BLOCKED COUNT", "ARBITRATION WAIT TIME", "MORE COMPATIBLE FEATURES", and "CRC". "INIT" represents whether the transmission source operates as an initiator or a target. For example, when the transmission source operates as an initiator, 1 is set to the "INIT". When the transmission source operates as a target, 0 is set to the "INIT". "PROTOCOL" represents a type of a protocol such as the SAS and SATA (Serial Advanced Technology Attachment). "ADDRESS FRAME TYPE" represents a type of an address frame. "CONNECTION RATE" represents a communication rate. "INITIATOR CONNECTION TAG" is used for SSP connection. "DESTINATION SAS ADDRESS" represents an address of a transmission destination. "SOURCE SAS ADDRESS" represents an address of a transmission source. "PATHWAY BLOCKED COUNT" represents a retry number of a connection request. "ARBITRATION WAIT TIME" represents a waiting time for receiving a connection request. "CRC" represents a code for error detection. The OPEN Address Frame can be issued by both the initiator 100 and the target 200.

A configuration of the memory system 200 will be described below. For example, the ports 0 to N receive a read command RC from one or more of the initiators A to Z with which communication is established, and the ports 0 to N output the received read command RC to the firmware executor 202. Also, the ports 0 to N transmit data read out of the data buffer 205 by the transmission controller 211, to the one or more of the initiators A to Z with which communication is established. In accordance with the read command RC received by the port 201, the firmware executor 202 registers the read command RC in the transmission data management table TB1 which includes transmittable data number information.

FIG. 4 illustrates a transmission data management table TB1 according to the first embodiment. The transmission data management table TB1 is a table for managing the transmittable data number with respect to each of the read commands RC. The transmission data management table TB1 includes "Valid", "COMMAND TAG", "START LBA", "TOTAL TRANSMISSION NUMBER", "CLUSTER NUMBER", "PORT NUMBER", "INITIATOR INFORMATION", "DATA TAGS", "TRANSMITTABLE DATA NUMBER INFORMATION", and "Last".

"Valid" in the transmission data management table TB1 is information representing whether an entry registered with the transmission data management table TB1 is valid or invalid. "ENTRY" is an item necessary for executing the read command RC registered in the transmission data management table TB1. If "Valid" is 1, the entry is valid. If "Valid" is 0, the entry is invalid. "COMMAND TAG" in the transmission data management table TB1 is an identification code which is assigned to each command for identification. "START LBA" in the transmission data management table TB1 indicates a start position of data in the non-volatile memory 204. "START LBA" will be described below.

Figure 5:
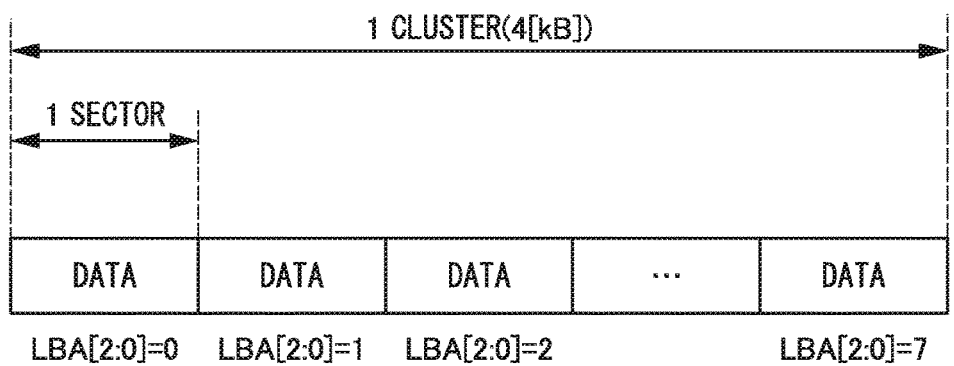
FIG. 5 illustrates a data structure of one cluster.
Figure 6:
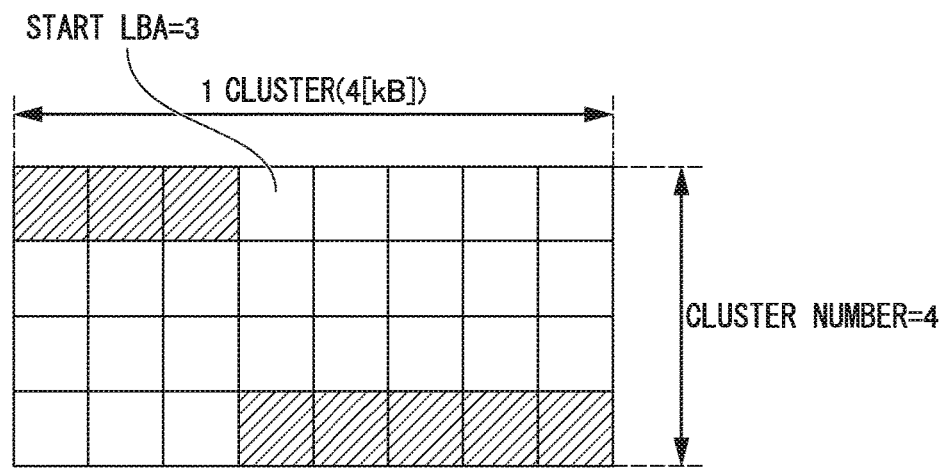
FIG. 6 illustrates a data structure of clusters that describes START LBA.

FIG. 5 illustrates data of one cluster according to the first embodiment. In FIG. 5, one cluster is 4 [kB] and one sector is 512 [B], where "sector" is a minimum unit of data stored in the non-volatile memory 204, and "cluster" is a group of the sectors, and is a minimum unit of data management. As shown in FIG. 5, the least three significant 3 bits of the LBA having 0 to 7 are configured as one cluster. FIG. 6 illustrates START LBA in the first embodiment. For example, if START LBA=3 and TOTAL TRANSMISSION NUMBER=24 (sectors) are met, then CLUSTER NUMBER=4 is met. "TOTAL TRANSMISSION NUMBER" in the transmission data management table TB1 represents a total transmission number (number of sectors) of the data. "CLUSTER NUMBER" in the transmission data management table TB1 represents the number of clusters of the data.

"PORT NUMBER" in the transmission data management table TB1 indicates an identifier of a port (one of the ports 0 to N), from which data are transmitted. "INITIATOR INFORMATION" in the transmission data management table TB1 indicates an identifier of an initiator (one of the initiators A to Z), to which data are transmitted.

"DATA TAGS" in the transmission data management table TB1 is a group of data tags indicating a storing position of data in the data buffer 205. "DATA TAGS" will be described below.

Figure 7:
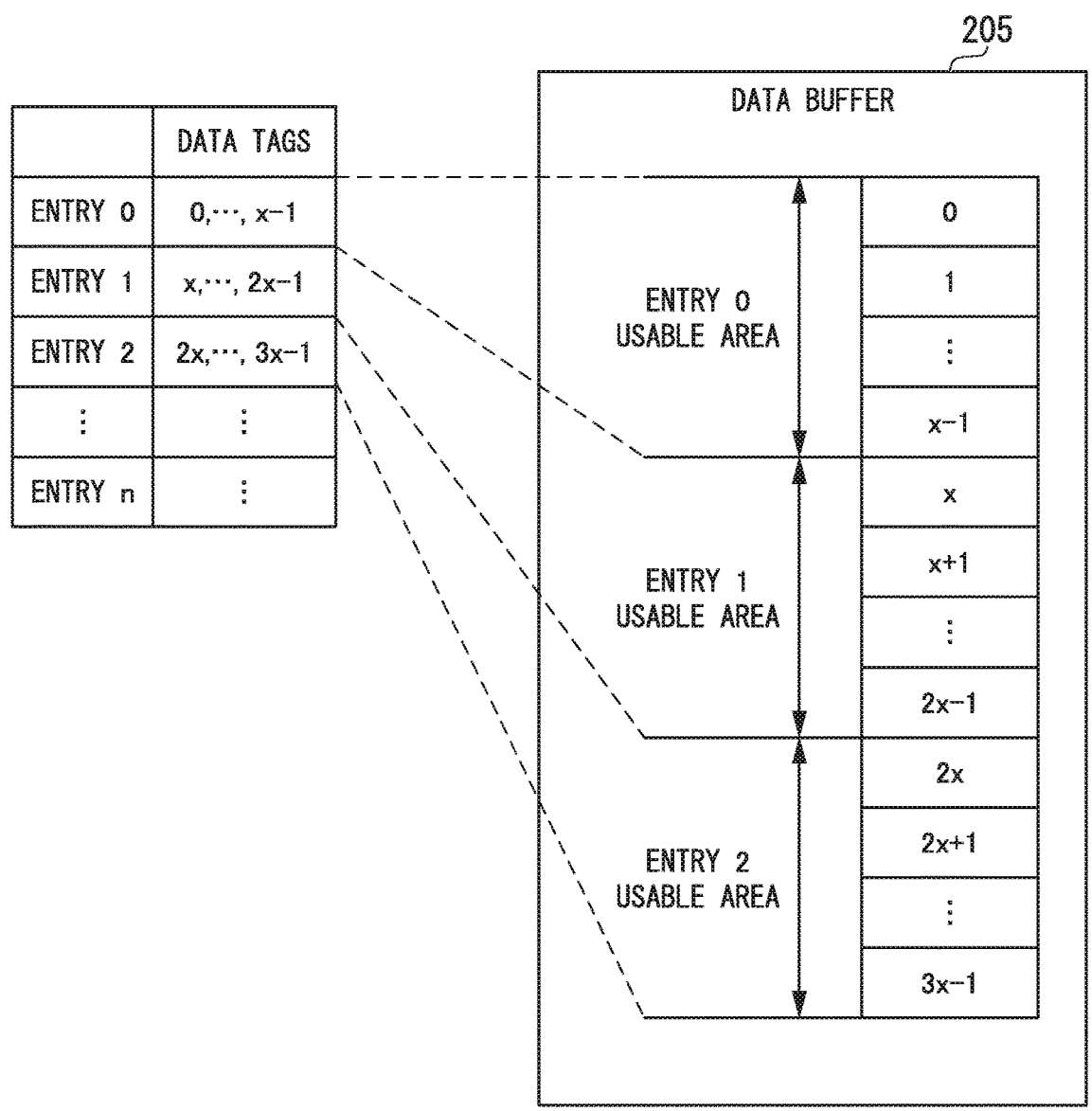
FIG. 7 illustrates data tags used to distinguish locations of a data buffer in the memory system according to the first embodiment.

FIG. 7 illustrates data tags according to the first embodiment. In FIG. 7, the data tags 0 to x−1 are allocated to the entry 0, the data tags x to 2x−1 are allocated to the entry 1, and the data tags 2x to 3x−1 are allocated to the entry 2. The data tags are used as a write address of the data buffer 205. The data tags, which are stored in the each entry of the transmission data management table TB1, are preliminarily associated with an area of the data buffer 205.

"TRANSMITTABLE DATA NUMBER INFORMATION" in the transmission data management table TB1 represents the number (for example, the number of sectors) of data units which becomes transmittable by being stored in the data buffer 205. "Last" in the transmission data management table TB1 represents whether or not all data corresponding to the command can be transmitted. For example, if Last=1, then all data corresponding to the command can be transmitted. If Last=0, then all data corresponding to the command cannot be transmitted. However, even if Last=0, in a case that the data having a size greater than a threshold exist in the data buffer 205, the data can be transmitted to the initiator.

The memory controller 203 shown in FIG. 1 refers to "PORT NUMBER" in the transmission data management table TB1. The memory controller 203 preferentially extracts an entry of a priority readout port number which is output from the readout port detector 220. The memory controller 203 reads the data of the extracted entry out of the non-volatile memory 204. The readout port detector 220 outputs the priority readout port number to the memory controller 203. Details of the readout port detector 220 will be described below.

The memory controller 203 stores the data read out of the non-volatile memory 204, into the data buffer 205, in accordance with the data tags stored in the transmission data management table TB1. The memory controller 203 updates the transmittable data number information and Last in the transmission data management table TB1 in accordance with a data storing state of the data buffer 205.

The execution command selector 206 refers to the transmission data management table TB1. The execution command selector 206 selects a command which becomes transmittable state. Specifically, the execution command selector 206 selects a command, of which transmittable data number exceeds a threshold or to which all corresponding data are transmittable, as a command which is in transmittable state. The execution command selector 206 outputs a list registering request to the reservation information manager 207. The list registering request includes information (the port number, the initiator information, and the data tags) related to the selected command which becomes the transmittable state. The reservation information manager 207 updates a reservation execution list L1, which is in the reservation information manager 207, based on the list registering request output from the execution command selector 206.

Figure 8:
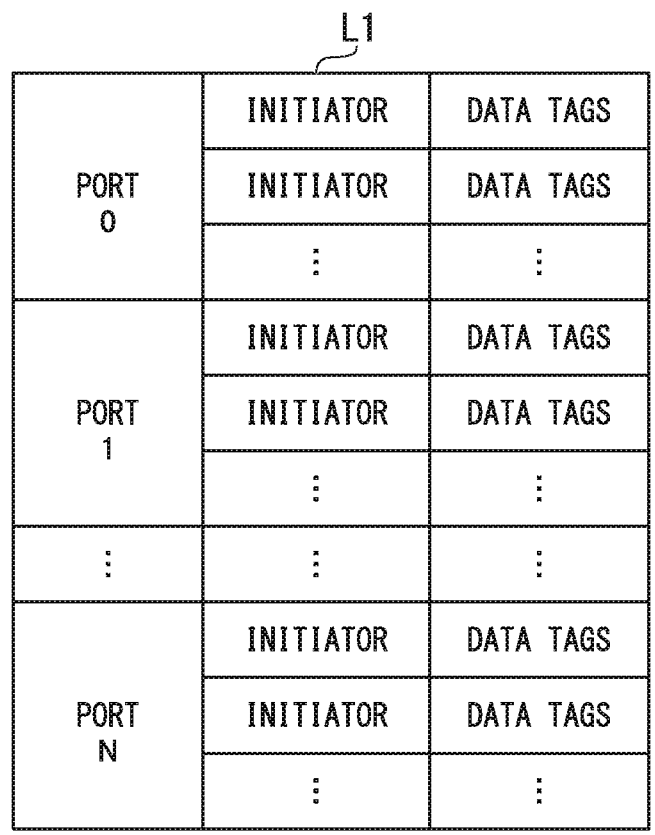
FIG. 8 illustrates a reservation execution list according to the first embodiment.

FIG. 8 illustrates an exemplary reservation execution list L1 in the first embodiment. As shown in FIG. 8, for example, an entry of the reservation execution list L1 is provided with respect to each of the ports 0 to N. The reservation information manager 207 registers, as reservation information, the initiator information and the data tags with the reservation execution list L1 in response to the list registering request output from the execution command selector 206. The reservation information manager 207 selects one unit of the reservation information which is registered with the reservation execution list L1. For example, the reservation information manager 207 selects the reservation information of data of which storing order is the earliest in the data buffer 205. In this case, for example, the reservation execution list L1 is configured as a list of FIFO (first-in first out) type. The reservation information manager 207 outputs the selected reservation information to the execution controller 209. The execution controller 209 registers the reservation information, which is output by the reservation information manager 207, with an execution management table TB2 as execution information.

Figure 9:
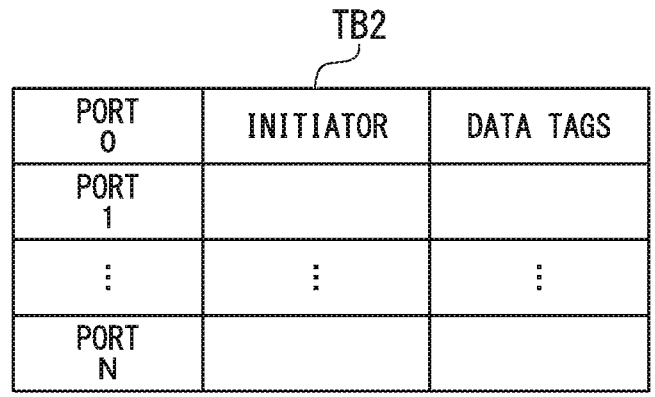
FIG. 9 illustrates an execution management table according to the first embodiment.

FIG. 9 illustrates an execution management table TB2 according to the first embodiment. As shown in FIG. 9, for example, an entry of the execution management table TB2 is provided with respect to each of the ports 0 to N. However, different from the reservation execution list L1, with respect to each port, only one unit of execution information is registered in the execution management table TB2.

The execution controller 209 shown in FIG. 1 includes a connection monitor 210. The connection monitor 210 outputs a confirmation request to inquire a connection state to the connection controller 215. The connection controller 215 outputs a port number (identifier of the port) and an initiator information (identifier of the initiator), which are in a connected state, to the connection monitor 210 in response to the confirmation request output from the connection monitor 210. In this way, the connection monitor 210 can monitor the connection state of the port 201, and the connection monitor 210 detects the initiator connected to the port 201 (which is in the connected state). In other words, the connection monitor 210 monitors whether or not the port 201 is connected to the initiator 100 from which the port 201 received the command, and the connection monitor 210 detects an identifier of the initiator from which the port 201 received the command.

The execution controller 209 determines whether or not a desired connection is established, based on the port number and the initiator information which are in a connected state and output from the connection controller 215. Here, "desired connection" means a connection with the initiator corresponding to the initiator information registered in the execution management table TB2. The execution controller 209 determines whether or not the port number and the initiator information, which are in a connected state and output from the connection controller 215, are the same as the port number and the initiator information which are registered in the execution management table TB2. If the port number and the initiator information, which are in a connected state and output from the connection controller 215, are the same as the port number and the initiator information which are registered in the execution management table TB2, the execution controller 209 determines that the desired connection is established.

If the desired connection is established, the execution controller 209 reads the execution information, of which transmission destination is the initiator 100 to which the desired connection is established, out of the execution management table TB2. Thereafter, the execution controller 209 outputs the execution information, which is read out of the execution management table TB2, to the transmission controller 211. The transmission controller 211 reads data out of the data buffer 205 in accordance with the data tags included in the execution information that is output from the execution controller 209. The transmission controller 211 outputs the data read out of the data buffer 205, to the port 201 corresponding to the port number included in the execution information. The port 201 transmits the data output from the transmission controller 211, to the initiator 100 which is in the connected state. In this way, the execution controller 209 controls the transmission controller 211 to transmit the data, which are in the data buffer 205 and correspond to the execution information registered in the execution management table TB2, from the port connected to the initiator, which is the transmission destination of the data.

If the port 201 receives a reception completion report ACK from the initiator 100, the port 201 outputs the reception completion report ACK to the firmware executor 202. The firmware executor 202 outputs an execution complete report to the execution controller 209 and the reservation information manager 207 in accordance with the reception completion report ACK output from the port 201. The execution controller 209 removes the execution information, which is completely transmitted, from the execution management table TB2, in accordance with the execution complete report output from the firmware executor 202. Also, the reservation information manager 207 removes the reservation information, which is completely transmitted, from the reservation execution list L1.

The port 201 may output the reception completion report ACK to the execution controller 209, instead of outputting the reception completion report ACK to the firmware executor 202. In this case, the execution controller 209 may output the reception completion report ACK to the reservation information manager 207 in accordance with the reception completion report ACK output from the port 201.

Thereafter, if reservation information, which can be executed using the currently-established connection, exists in the reservation execution list L1, the execution controller 209 registers the reservation information in the execution management table TB2. Thereby, it is possible to transmit as much data as possible using the currently-established connection.

On the other hand, if no initiator 100 is connected to the port 201, the execution controller 209 outputs a connection request to the connection controller 215. The connection request includes a port number and initiator information which are registered in the execution management table TB2. The connection controller 215 performs the OPEN sequence for establishing the connection between the port 201 and initiator 100 based on the port number and the initiator information output from the execution controller 209. If the desired connection is established by the OPEN sequence, the port 201 transmits data to the initiator 100 which is in the connected state. In this way, if the ports 0 to N are not connected to the initiators A to Z, the execution controller 209 controls the connection controller 215 to establish a connection with the initiator which is a transmission destination corresponding to a command registered in the execution management table TB2.

If the desired connection is not established, the execution controller 209 outputs a search request to the reservation information manager 207. The search request includes the port number and the initiator information which are in the connected state. The searcher 208, which is disposed in the reservation information manager 207, searches the reservation execution list L1 in response to the search request output from the execution controller 209. Specifically, the searcher 208 searches for reservation information corresponding to the port number and the initiator information included in the search request, in the reservation execution list L1. If the reservation information corresponding to the port number and the initiator information in the search request exists in the reservation execution list L1, the searcher 208 outputs the reservation information to the execution controller 209.

In other words, if there is no port connected to the initiator which is the transmission destination corresponding to the command registered in the execution management table TB2, the searcher 208 searches, from commands registered in the execution management table TB2, a command of which transmission destination is the initiator connected to the port 201. Thereafter, the searcher 208 transmits a command, which is obtained by the search, to the execution controller 209.

The execution controller 209 registers the reservation information received from the searcher 208, in the execution management table TB2 as execution information, that is, replaces the reservation information that has been registered in the execution management table TB2 with the one received from the searcher 208. The execution controller 209 outputs the execution information, which is registered in the execution management table TB2, to the transmission controller 211. The transmission controller 211 reads data out of the data buffer 205 in accordance with the data tags included in the execution information output from the execution controller 209. The transmission controller 211 outputs the data read out of the data buffer 205 to the port 201 corresponding to the port number included in the execution information. The port 201 transmits the data output from the transmission controller 211 to the initiator 100 which is in the connected state.

In this way, the execution controller 209 controls the transmission controller 211 to transmit the data in the data buffer 205 and corresponding to the command registered in the execution management table TB2, via the port connected to the initiator which is the transmission destination of the data. Thereby, even if the desired connection is not established, the data can be transmitted to the initiator 100.

Figure 10:
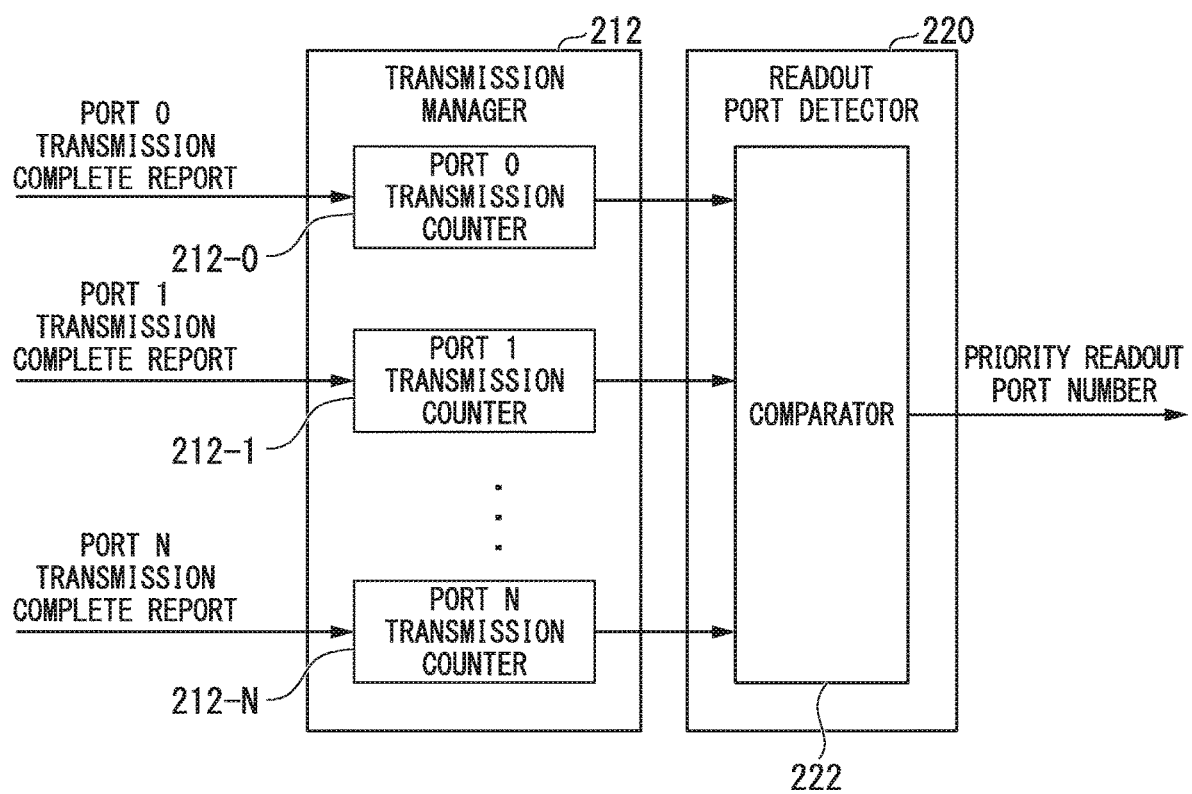
FIG. 10 is a block diagram of the transmission manager and the readout port detector according to the first embodiment.

If the data have been completely transmitted, the transmission controller 211 outputs a transmission complete report of each port to the transmission manager 212. FIG. 10 is a block diagram illustrating the transmission manager 212 and the readout port detector 220 according to the first embodiment. The transmission complete report includes information indicating the number of data units which have been completely transmitted. As shown in FIG. 10, the transmission manager 212 includes transmission counters 212-0 to 212-N which are disposed with respect to ports 0 to N, respectively. The transmission counters 212-0 to 212-N respectively count the number of data units transmitted from the ports 0 to N. The transmission counters 212-0 to 212-N respectively output the counted number of data units to the readout port detector 220.

The readout port detector 220 includes a comparator 222. The comparator 222 compares the numbers of data units output from the transmission counters 212-0 to 212-N of the transmission manager 212, respectively. Thereafter, the comparator 222 outputs a port number corresponding to the least number of data units, among the numbers of data units counted by the transmission counters 212-0 to 212-N, to the memory controller 203. The port number, which is output from the comparator 222, is a priority readout port number. The memory controller 203 refers to "PORT NUMBER" of the transmission data management table TB1, and preferentially extracts an entry of the priority readout port number which is output from the readout port detector 220. The memory controller 203 reads the data of the extracted entry out of the non-volatile memory 204 prior to reading the other data out of the non-volatile memory 204.

Thereby, because the port 201 can preferentially transmit data through a less-frequently used port, variation in transmission numbers of data among the ports can be reduced. Therefore, the transmission numbers of data among to the ports can be more uniformed, and more efficient data transmission can be performed.

The readout port detector 220 may detect the priority readout port number by weighting each port based on a connection rate of the each port. If the connection rates with respect to the ports are varied, for example, the comparator 222 of the readout port detector 220 may multiply, as the weighting, the transmission number of data with respect to each port by an inverse of the connection rate. Thereby, the transmission numbers of data among the ports can be more uniformed, and more efficient data transmission can be performed. Also, in a low power consumption mode, in order to intentionally lower a performance of the memory system 200, the readout port detector 220 may reduce the outputs of the priority readout port number. Thereby, accesses to the non-volatile memory 204 can be reduced, and power consumption of the memory system 200 can be reduced.

Figure 11:
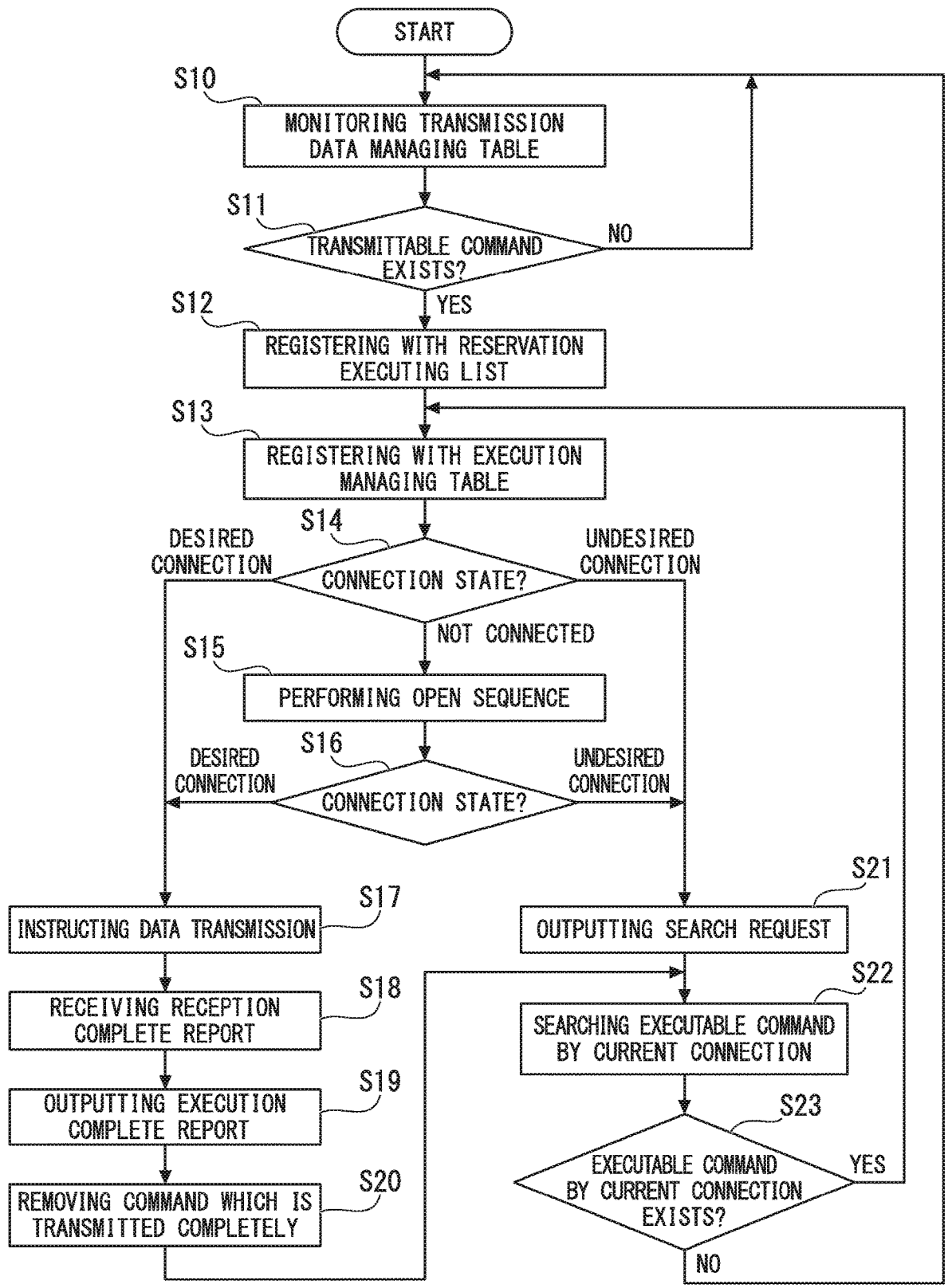
FIG. 11 is a flowchart illustrating an operation of the memory system according to the first embodiment.

FIG. 11 is a flowchart illustrating an operation of the memory system 200 according to the first embodiment. First, the execution command selector 206 monitors the transmission data management table TB1 (step S10). Next, the execution command selector 206 determines whether or not a transmittable command exists in the transmission data management table TB1 (step S11).

If the execution command selector 206 determines that no transmittable command exists in the transmission data management table TB1 (No in step S11), the process returns to the step S10 and the execution command selector 206 continues to monitor the transmission data management table TB1. On the other hand, if the execution command selector 206 determines that a transmittable command exists in the transmission data management table TB1 (Yes in step S11), the execution command selector 206 outputs a list registering request related to the transmittable command to the reservation information manager 207. The reservation information manager 207 registers the reservation information in the reservation execution list L1 in response to the list registering request output from the execution command selector 206 (step S12). Thereafter, the reservation information manager 207 selects one unit of the reservation information registered in the reservation execution list L1. For example, the reservation information manager 207 selects the reservation information of which storing order is the earliest in the data stored in the data buffer 205. The reservation information manager 207 registers, as execution information, the selected reservation information in the execution management table TB2 in the execution controller 209 (step S13).

Next, the execution controller 209 determines the connection state between the initiator 100 and the port 201 (step S14). Specifically, the execution controller 209 determines whether the connection state is "desired connection is established", "desired connection is not established", or "no connection is established". For example, "desired connection is established" means that a transmission destination of data, of which storing order is the earliest among the data stored in the data buffer 205, corresponds to the initiator connected to the port 201. For example, "desired connection is not established" means that a transmission destination of data, of which storing order is the earliest among the data stored in the data buffer 205, does not correspond to the initiator connected to the port 201".

At the step S14, the connection monitor 210, which is in the execution controller 209, outputs a confirmation request to inquire a connection state to the connection controller 215. The connection controller 215 outputs the port number and the initiator information, which are in a connected state, to the connection monitor 210 in accordance with the confirmation request output from the connection monitor 210. The connection monitor 210 determines whether or not the desired connection is established, based on the port number and the initiator information which are in a connected state and output from the connection controller 215.

At the step S14, if the execution controller 209 determines that no connection with the initiator 100 is established, the execution controller 209 instructs the connection controller 215 to perform the OPEN sequence (step S15). After the OPEN sequence is executed, the connection monitor 210 determines the connection state between the initiator 100 and the port 201 (step S16). At the step S16, if the desired connection is established, step S17 described below is performed. On the other hand, at the step S16, if an undesired connection is established, step S21 described below is performed.

At the step S14, if the execution controller 209 determines that the desired connection is established, the execution controller 209 instructs the transmission controller 211 to transmit data (step S17). Specifically, the execution controller 209 reads the execution information, of which transmission destination is the initiator 100 with which the desired connection is established, out of the execution management table TB2. Thereafter, the execution controller 209 outputs the execution information read out of the execution management table TB2 to the transmission controller 211. The transmission controller 211 reads data out of the data buffer 205 in accordance with the data tags included in the execution information output from the execution controller 209. The transmission controller 211 outputs the data, which is read out of the data buffer 205, to the port 201 corresponding to the port number included in the execution information. The port 201 transmits the data output from the transmission controller 211 to the initiator 100 which is in the connected state.

Next, the port 201 receives a reception completion report ACK from the initiator 100 (step S18). Thereafter, the port 201 outputs the reception completion report ACK to the firmware executor 202. The firmware executor 202 outputs an execution complete report to the execution controller 209 and the reservation information manager 207 in accordance with the reception completion report ACK which is output from the port 201 (step S19). The execution controller 209 removes the execution information, which is completely transmitted, from the execution management table TB2, in accordance with the execution complete report output from the firmware executor 202. Also, the reservation information manager 207 removes the reservation information, which is completely transmitted, from the reservation execution list L1 (step S20). Thereafter, step S22 described below is performed.

At the step S14, if the execution controller 209 determines that the undesired connection is established, the execution controller 209 outputs a search request to the reservation information manager 207 (step S21). The searcher 208, which is disposed in the reservation information manager 207, searches the reservation execution list L1 for a command (reservation information) that can be executed using the currently-established connection (step S22). Thereafter, in accordance with the search result of the searcher 208, the execution controller 209 determines whether or not the command which can be executed using the currently-established connection exists (step S23).

At the step S23, if the execution controller 209 determines that the command be executed using the currently-established connection exists (Yes in step S23), the process returns to step S13. Then, the execution controller 209 registers the command obtained through the search in step S22, in the execution management table TB2. On the other hand, if the execution controller 209 determines that the command which can be executed using the currently-established connection does not exist (No in step S23), the process returns to step S10. Then, the execution controller 209 monitors the transmission data management table TB1.

Figure 12:
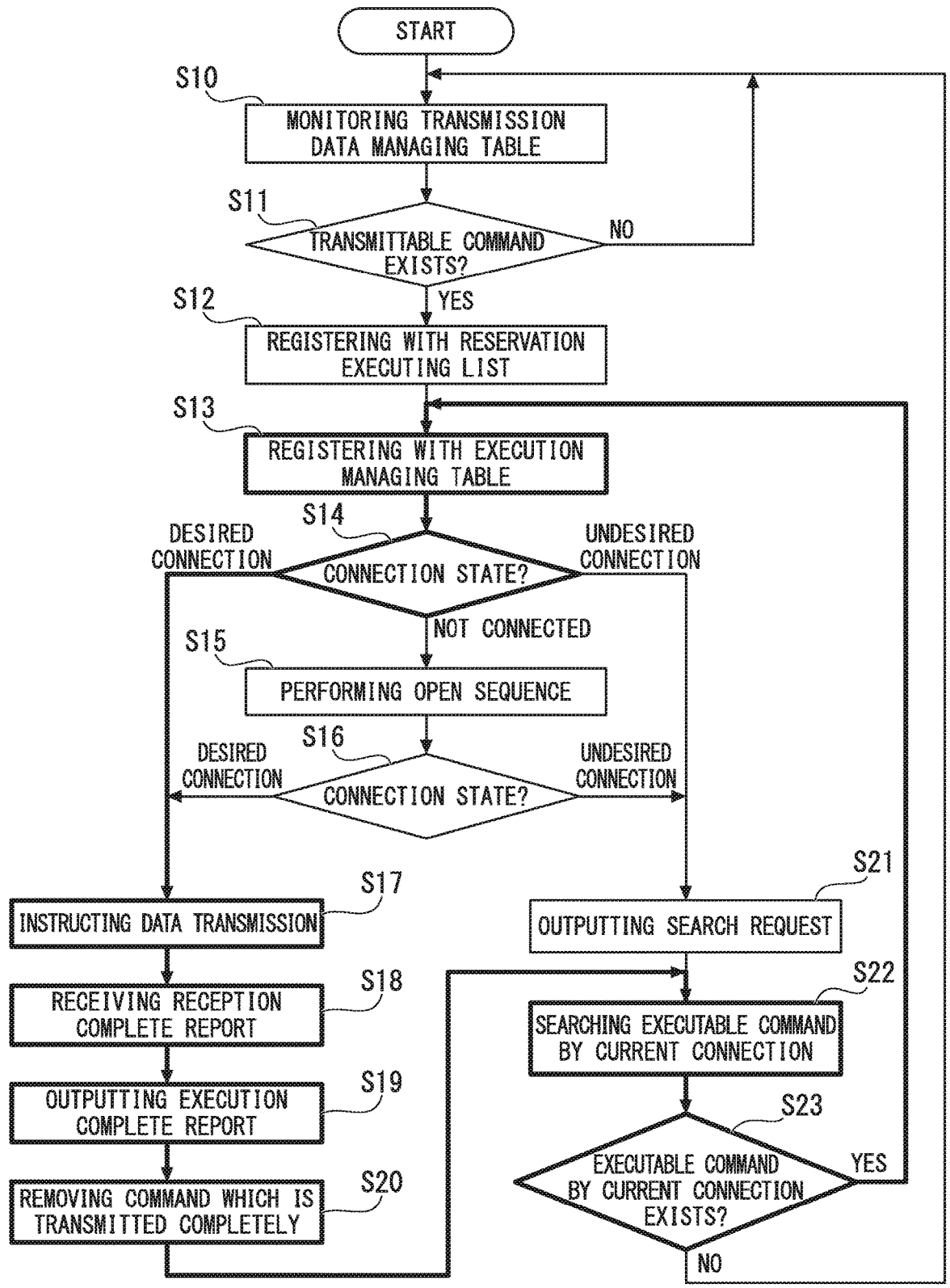
FIG. 12 is a flowchart of FIG. 11 that illustrates a procedure of executing a plurality of commands when the desired connection is established using thick arrows.

FIG. 12 is a flowchart illustrating an operation of executing a plurality of commands when the desired connection is established. In this case, the processes are repeated along the route shown by the thick arrows in FIG. 12. That is, the memory system 200 registers a command in the execution management table TB2 in step S13, determines that the desired connection is established in step S14, instructs the transmission controller 211 to transmit data in step S17, receives a reception completion report ACK from the initiator 100 in step S18, outputs an execution complete report in step S19, and removes the reservation information, which is completely transmitted, from the execution management table TB2 and the reservation execution list L1 in step S20. Thereafter, the memory system 200 searches for a command which can be executed using the currently-established connection in step S22, determines that the command which can be executed using the currently-established connection exists in step S23, and registers the command in the execution management table TB2 in step S13. Thereby, it is possible to transmit as much data as possible using the currently-established connection.

Figure 13:
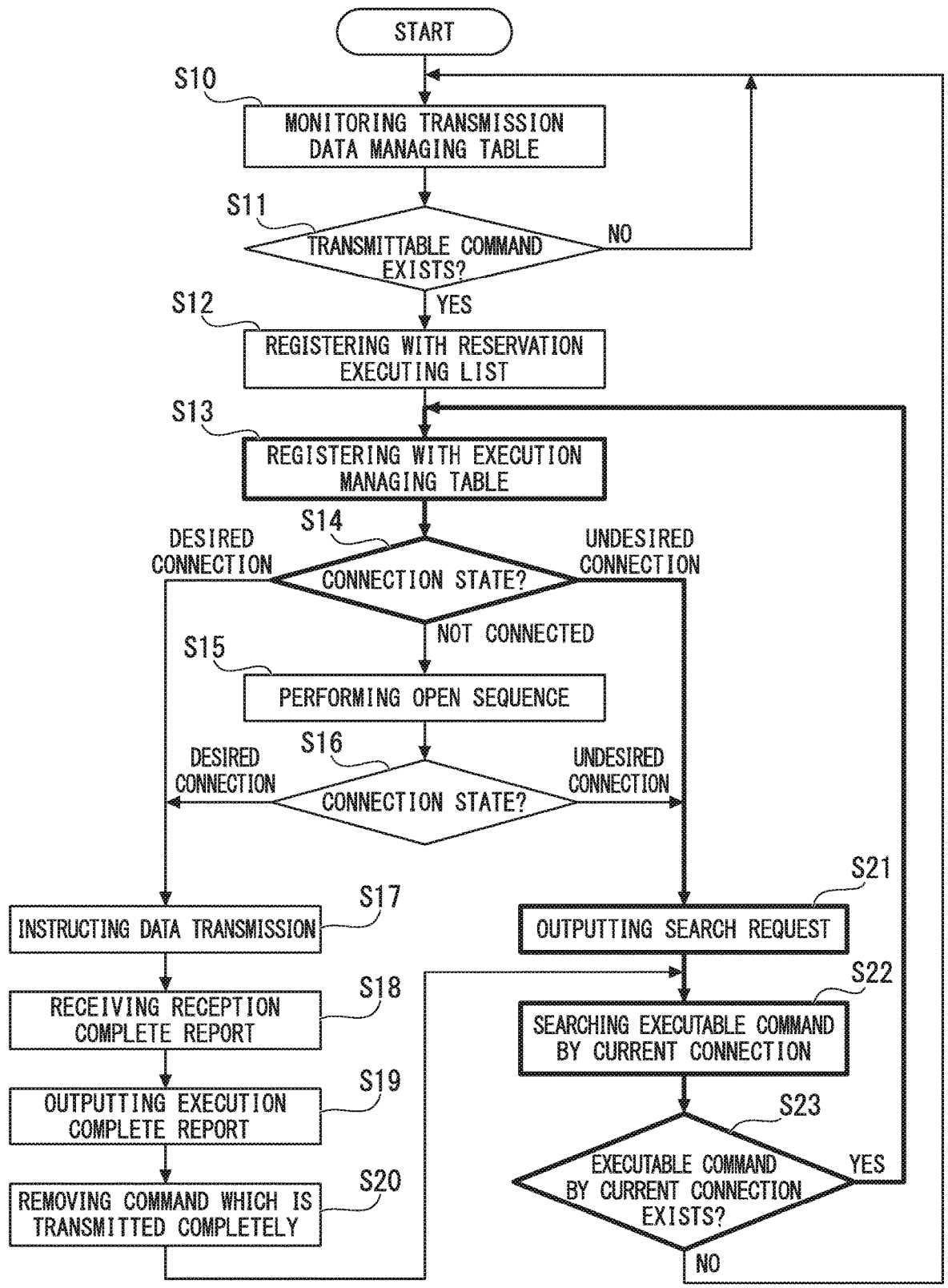
FIG. 13 is a flowchart of FIG. 11 that illustrates a procedure of executing a plurality of commands when the desired connection is not established using thick arrows.

FIG. 13 is a flowchart illustrating an operation of executing a plurality of commands when the desired connection is not established. In this case, the processes are repeated along the route shown by the thick arrows in FIG. 13. That is, the memory system 200 registers a command in the execution management table TB2 in step S13, determines that the undesired connection is established in step S14, outputs a search request in step S21, searches for a command which can be executed using the currently-established connection in step S22, determines that the command which can be executed using the currently-established connection exists in step S23, and registers the command in the execution management table TB2 in step S13.

If the desired connection is not established, a conventional memory system repeats the OPEN sequence until the desired connection is established. Therefore, the conventional memory system cannot transmit data until the desired connection is established, and a data transmission efficiency of the conventional memory system is decreased. In contrast, according to the present embodiment, if the desired connection is not established, the execution controller 209 executes a command which can be executed using the currently-established connection. Thereby, even if the desired connection is not established, the data can be transmitted to the initiator 100, and the data transmission efficiency of the memory system 200 can be increased.

Next, communication processes between a target and an initiator according to the present embodiment will be described with reference to FIG. 14 to FIG. 17. In FIG. 14 to FIG. 17, the expander 300 is omitted in order to simplify the description.

Figure 14:
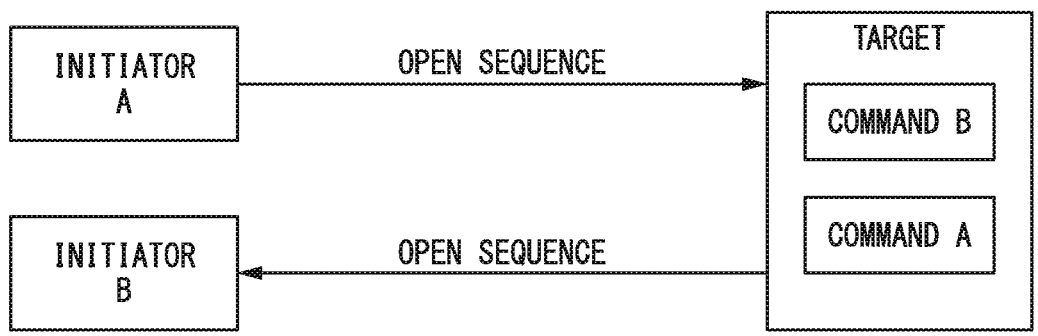
FIG. 14 schematically illustrates communication processing between the target and the initiators A and B.

As shown in FIG. 14, data associated with a command A and data associated with a command B are stored in the data buffer 205 of a target (memory system 200). A storing order of the data in the data buffer 205 is in order of the command B and the command A. In other words, the data associated with the command B is stored in the data buffer 205 earlier than the data associated with the command A. The transmission destination of the data associated with the command A is an initiator A, and the transmission destination of the data associated with the command B is an initiator B. In order to transmit the data associated with the command B of which storing order is the earliest, for example, the target performs the OPEN sequence from the port 0 to the initiator B. If the initiator A simultaneously performs the OPEN sequence with respect to the port 0 of the target, the expander 300 arbitrates (i.e., resolves the connection conflict).

Figure 15:
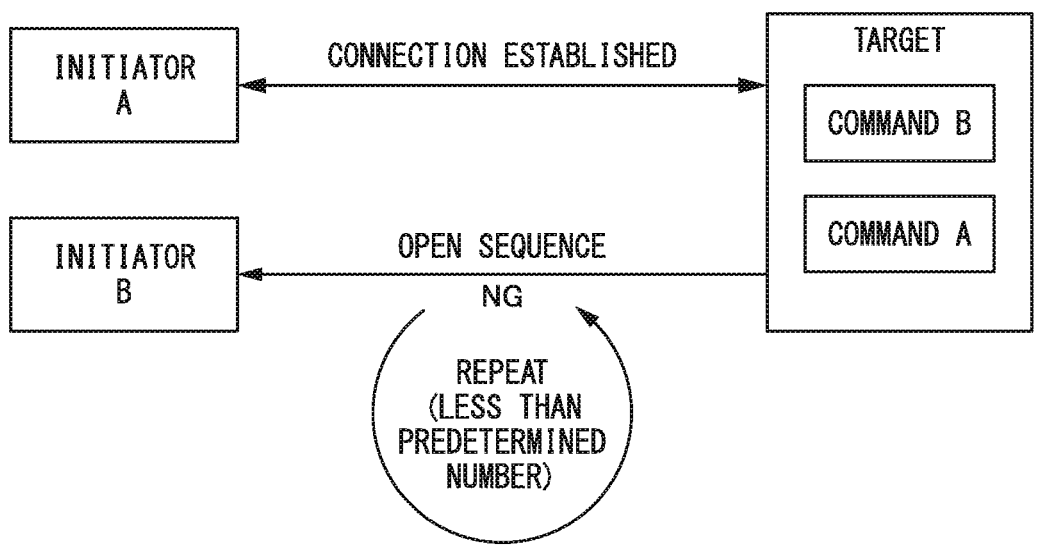
FIG. 15 schematically illustrates communication processing when the connection between the target and the initiator B is not established.

As shown in FIG. 15, if the connection between the initiator A and the target is established as a result of the arbitration performed by the expander 300, the connection between the initiator B and the target is not established. Also, if the connection between the initiator A and the target is established before the target performs the OPEN sequence to the initiator B, the connection between the initiator B and the target is not established.

If the desired connection is not established, it is considered that the memory system (target) repeats the OPEN sequence until the desired connection is established. In this case, the conventional memory system cannot transmit data until the desired connection is established, and a data transmission efficiency of the conventional memory system is decreased.

Figure 16:
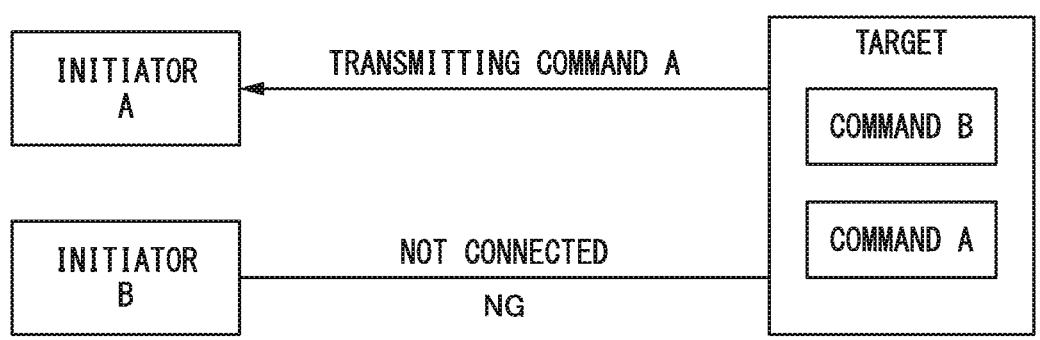
FIG. 16 schematically illustrates communication processing when the connection between the target and the initiator B is not established.

In the present embodiment, as shown in FIG. 15, if the desired connection (connection with the initiator B) is not established, the target does not perform the OPEN sequence, or repeats the OPEN sequence only less than predetermined number of times or only for a predetermined period of time. Thereafter, as shown in FIG. 16, the target transmits the data associated with the command A, of which transmission destination is the initiator A of which connection is established, to the initiator A.

In this way, when the connection between the target (memory system 200) and the initiator B is not established and the connection between the target (memory system 200) and the initiator A is established, to transmit the data associated with command B, the connection controller 215 does not perform the OPEN sequence more than or equal to the predetermined number of times or the predetermined period of time. The predetermined number of times and the predetermined period of time may be equal to 0. In other words, the connection controller 215 may perform no OPEN sequence to the initiator B. Thereby, even if the desired connection is not established, the data can be transmitted to the initiator, and the data transmission efficiency of the target (memory system) can be increased.

As described above, according to the first embodiment, the connection monitor 210 monitors whether or not the port 201 is connected to the initiator 100 from which the port 201 receives the command, and the connection monitor 201 detects the identifier of the initiator 100 from which the port 201 receives the command. The execution controller 209 controls the transmission controller 211 to read a first set of data, which are to be transmitted to the initiator 100 connected to the port 201, out of the data buffer 205, if the execution controller 209 determines that the identifier is not associated with a second set of data in the data buffer 205, which is to be transmitted prior to the other data in the data buffer 205. The other data include the first set of data. The execution controller 209 controls the transmission controller 211 to transmit the first set of data. Thereby, the data transmission efficiency of the memory system 200 can be increased.

Second Embodiment

Next, a memory system 200 according to a second embodiment is described. The memory system 200 according to the second embodiment differs from the memory system 200 according to the first embodiment in that the former memory system 100 includes a selector 213 and a readout manager 214 instead of the transmission manager 212. Hereinafter, differences between the first embodiment and the second embodiment will be mainly described.

Figure 17:
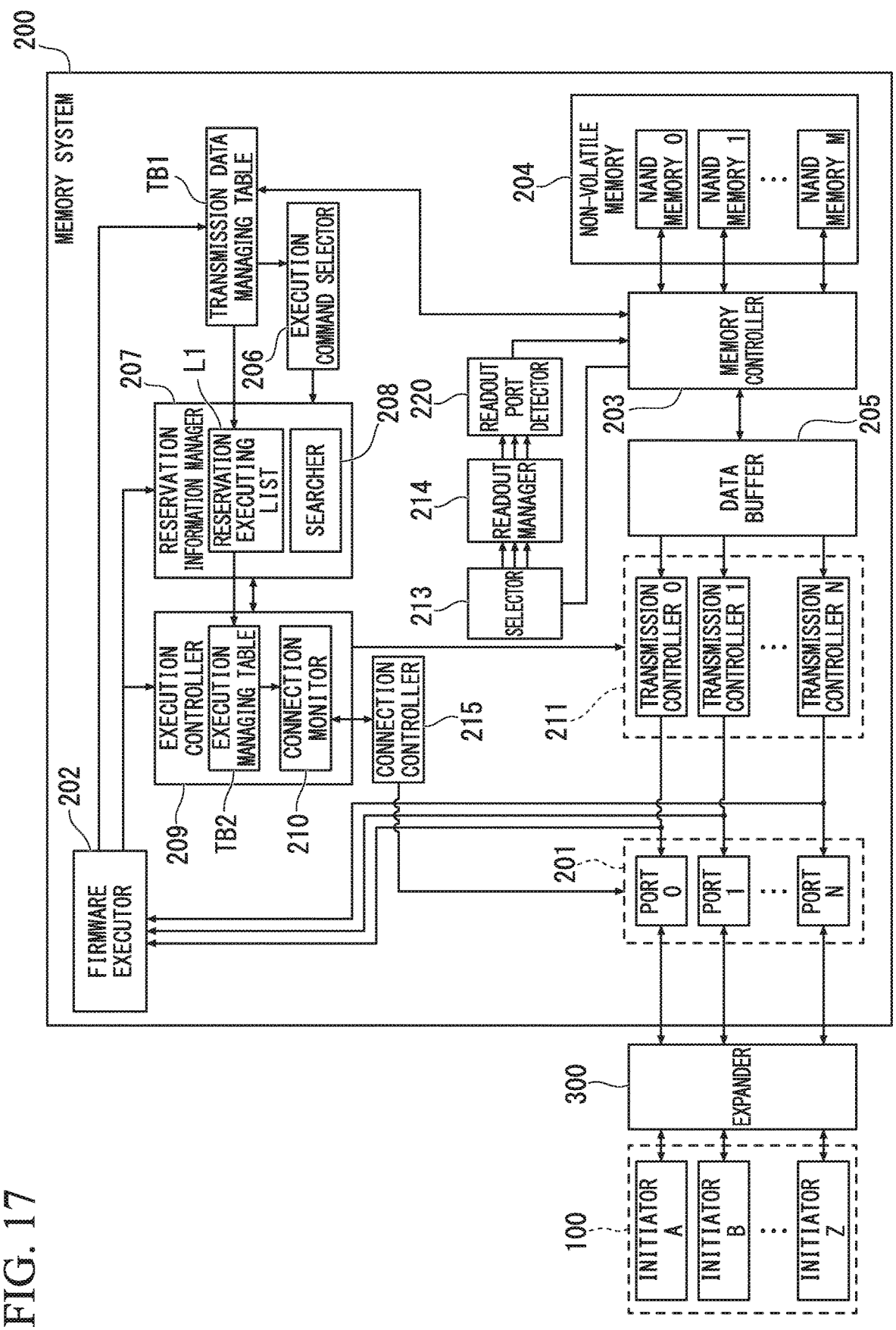
FIG. 17 is a block diagram of the memory system according to the second embodiment.

FIG. 17 is a block diagram of the memory system 200 according to the second embodiment. In FIG. 17, elements corresponding to those in FIG. 1 are depicted with the same reference numerals, and the descriptions thereof will be omitted. In the second embodiment, the readout port detector 220 outputs a priority readout port number to the memory controller 203. Details of the readout port detector 220 will be described below. The memory controller 203 refers to "PORT NUMBER" of the transmission data management table TB1, and preferentially extracts an entry of the priority readout port number, which is output from the readout port detector 220. The memory controller 203 reads the data of the extracted entry out of the non-volatile memory 204 prior to reading the other data out of the non-volatile memory 204.

The memory controller 203 stores the data, which are read out of the non-volatile memory 204, in the data buffer 205 in accordance with the data tags stored in the transmission data management table TB1. If the memory controller 203 has completely stored the data from the non-volatile memory 204 into the data buffer 205, the memory controller 203 outputs a readout complete report to the selector 213. The readout complete report includes a port number corresponding to the data that have been completely readout and information indicating the number of data units that have been completely readout.

Figure 18:
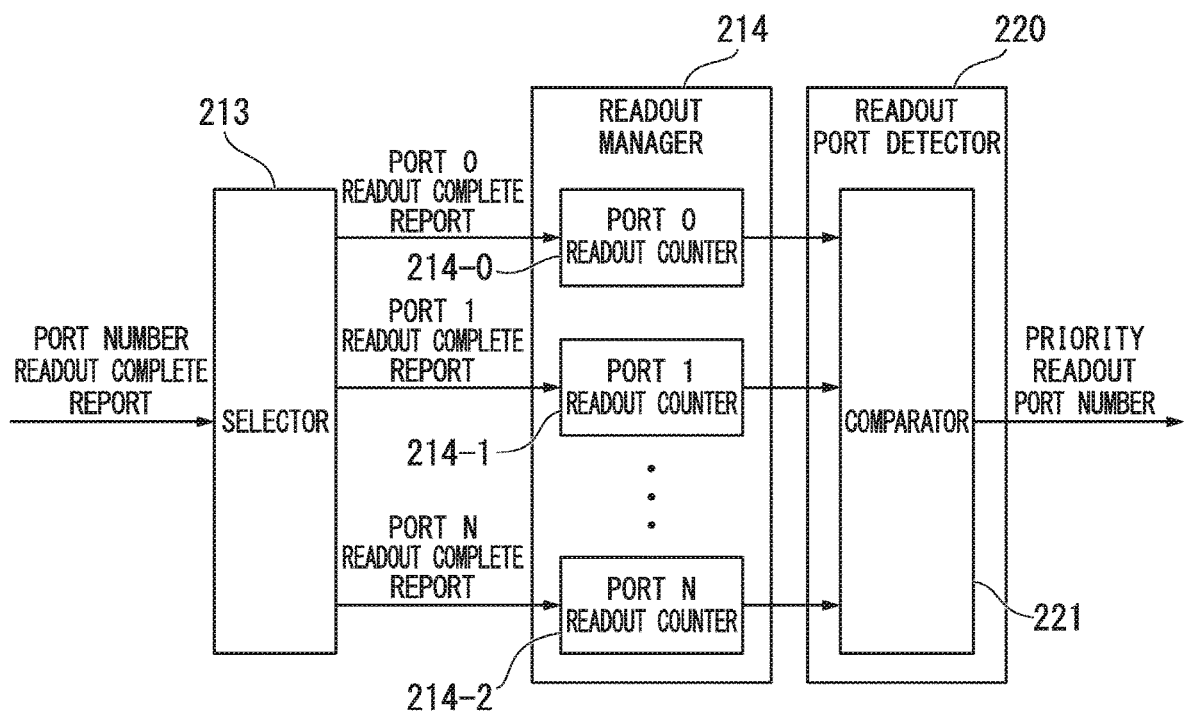
FIG. 18 is a block diagram of the readout manager and the readout port detector according to the second embodiment.

FIG. 18 is a block diagram of the readout manager 214 and the readout port detector 220 according to the second embodiment. As shown in FIG. 18, the selector 213 outputs the readout complete report to an output destination according to the port number included in the readout complete report from the memory controller 203. The readout manager 214 includes readout counters 214-0 to 214-N which are disposed with respect to the ports 0 to N, respectively. The readout counters 214-0 to 214-N are respectively disposed with respect to the ports 0 to N, and count the number of data units stored in the data buffer 205. The readout counters 214-0 to 214-N respectively output the counted number of data units to the readout port detector 220.

The readout port detector 220 includes a comparator 221. The comparator 221 compares the numbers of data units which are respectively output from the readout counters 214-0 to 214-N of the readout manager 214. Thereafter, the comparator 221 outputs, as a priority readout port number, a port number corresponding to the least number of data unit, among the numbers of data units which are counted by the readout counters 214-0 to 214-N, to the memory controller 203. The memory controller 203 refers to "PORT NUMBER" of the transmission data management table TB1, and preferentially extracts an entry of the priority readout port number output from the readout port detector 220. The memory controller 203 reads the data of the extracted entry out of the non-volatile memory 204 prior to reading the other data out of the non-volatile memory 204.

Because the port 201 can preferentially transmit data of a less frequently used port, variation in transmission numbers of data among the ports can be reduced. Therefore, according to the second embodiment, the transmission numbers of data among the ports can be more uniformed, and more efficient data transmission can be performed.

Also, in a low power consumption mode, in order to intentionally lower a performance of the memory system 200, the readout port detector 220 may reduce the outputs of the priority readout port number. Thereby, accesses to the non-volatile memory 204 can be reduced, and power consumption of the memory system 200 can be reduced.

Third Embodiment

Next, a memory system 200 according to a third embodiment is described. The memory system 200 according to the third embodiment differs from the memory system 200 according to the first embodiment in that the former memory system further includes a selector 213 and a readout manager 214. Hereinafter, differences between the first embodiment and the third embodiment will be mainly described.

Figure 19:
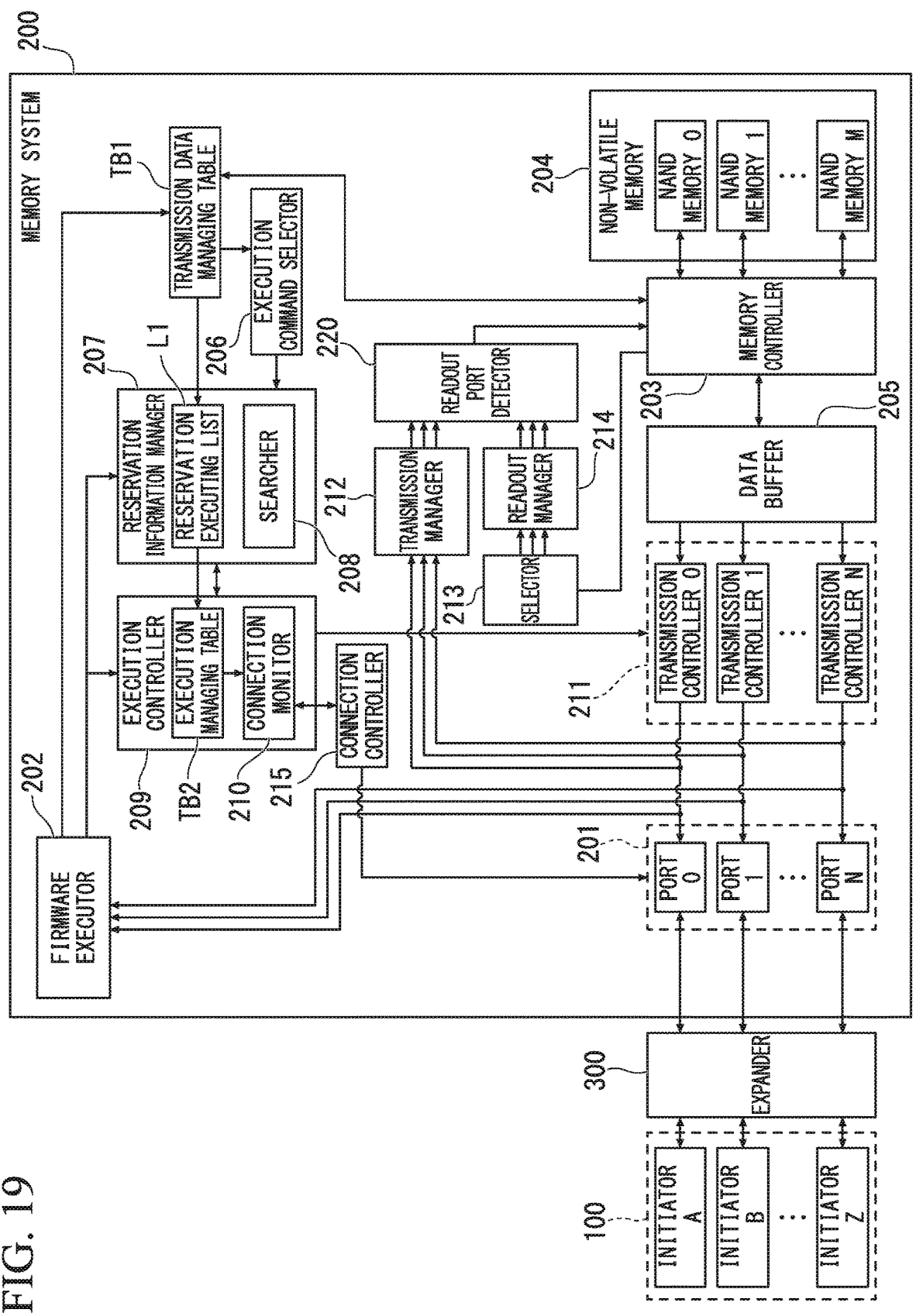
FIG. 19 is a block diagram of the memory system according to the third embodiment.

FIG. 19 is a block diagram of the memory system 200 according to the third embodiment. In FIG. 19, elements that correspond to those in FIG. 1 are depicted with the same reference numerals, and the descriptions thereof will be omitted. In the third embodiment, if the data have been completely transmitted, the transmission controller 211 outputs a transmission complete report of each port to the transmission manager 212. The transmission complete report includes information indicating the number of data units which have been completely transmitted. On the other hand, if the memory controller 203 completely stores the data from the non-volatile memory 204 to the data buffer 205, the memory controller 203 outputs a readout complete report to the selector 213. The readout complete report includes a port number corresponding to completely-readout data and information indicating the number of data units which have been completely readout.

Figure 20:
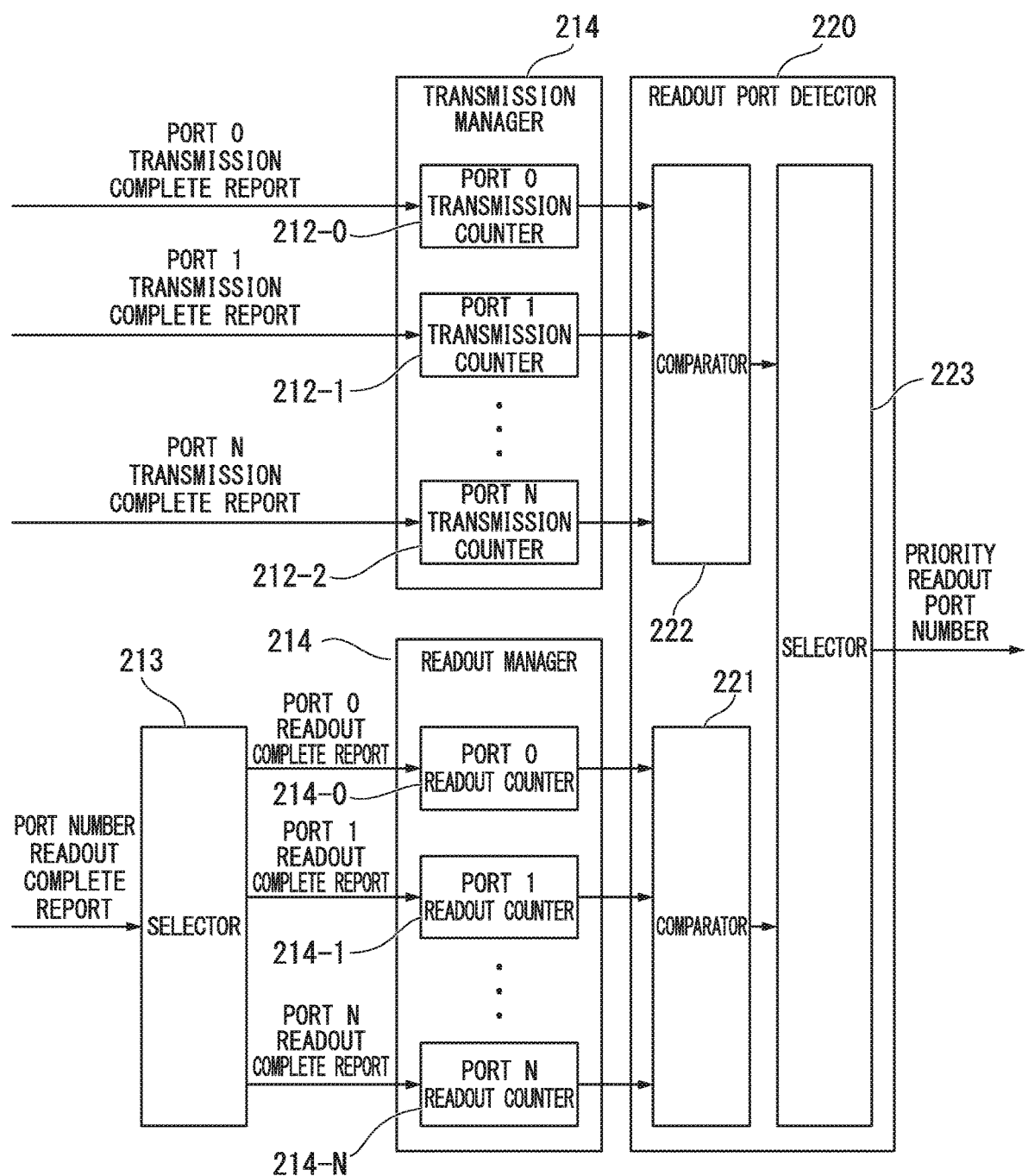
FIG. 20 is a block diagram of the transmission manager, the readout manager, and the readout port detector according to the third embodiment.

FIG. 20 is a block diagram of the transmission manager 212, the readout manager 214, and the readout port detector 220 according to the third embodiment. As shown in FIG. 20, the transmission manager 212 includes transmission counters 212-0 to 212-N which are disposed with respect to ports 0 to N, respectively. The transmission counters 212-0 to 212-N respectively count the number of data units transmitted from the ports 0 to N. The transmission counters 212-0 to 212-N respectively output the counted number of data units to the readout port detector 220.

The readout port detector 220 includes a comparator 222. The comparator 222 compares the numbers of data units which are output from each of the transmission counters 212-0 to 212-N of the transmission manager 212. Thereafter, the comparator 222 outputs a port number corresponding to the least number of data unit, among the numbers of data units which are counted by the transmission counters 212-0 to 212-N, to the selector 223.

On the other hand, the selector 213 outputs the readout complete report to an output destination corresponding to the port number included in the readout complete report output from the memory controller 203. The readout manager 214 includes readout counters 214-0 to 214-N which are disposed with respect to the ports 0 to N. The readout counters 214-0 to 214-N are respectively disposed with respect to the ports 0 to N, and count the number of data units stored in the data buffer 205. The readout counters 214-0 to 214-N respectively output the counted number of data units to the readout port detector 220.

The readout port detector 220 includes a comparator 221. The comparator 221 compares the numbers of data units output from each of the readout counters 214-0 to 214-N of the readout manager 214. Thereafter, the comparator 221 outputs a port number corresponding to the least number of data units, among the numbers of data units counted by the readout counters 214-0 to 214-N, to the selector 223.

The selector 223 selects one of the port number output from the comparator 222 and the port number output from the comparator 221. The firmware executor 202 can arbitrarily set whether to select the port number output from the comparator 222 or the port number output from the comparator 221. The selector 223 outputs the selected port number to the memory controller 203 as the priority readout port number.

The memory controller 203 refers to "PORT NUMBER" of the transmission data management table TB1, and preferentially extracts an entry of the priority readout port number output from the readout port detector 220. The memory controller 203 reads the data of the extracted entry out of the non-volatile memory 204.

Because the port 201 can preferentially transmit data through a less frequently used port, variation in transmission numbers of data among the ports can be reduced. As a result, according to the third embodiment, the transmission numbers of data among the ports can be more uniformed, and more efficient data transmission can be performed.

The readout port detector 220 may detect the priority readout port number by weighting each port based on a connection rate of the each port. If the connection rates among the ports are varied, for example, the comparator 222 of the readout port detector 220 may multiply, as the weighting, the transmission number of data with respect to each of ports by an inverse of the connection rate. Thereby, the transmission numbers of data among the ports can be more uniformed, and more efficient data transmission can be performed. Also, in a low power consumption mode, in order to intentionally lower a performance of the memory system 200, the readout port detector 220 may reduce the outputs of the priority readout port number. Thereby, accesses to the non-volatile memory 204 can be reduced, and power consumption of the memory system 200 can be reduced.

According to the third embodiment, the selector 223 can switch whether to select the port number output from the comparator 222 or the port number output from the comparator 221. The firmware executor 202 controls the selector 223 to select one of the port numbers so that the transmission numbers of data among the ports can be more uniformed. Thereby, more efficient data transmission can be performed.

In the first to third embodiments, the SAS is used as a standard for connecting the initiator 100 and the memory system 200, but not limited thereto. For example, NVMe (Non-Volatile Memory Express), SATA (Serial ATA), or Internet Protocol may be used as the standard for connecting the initiator 100 and the memory system 200.

In at least one embodiment described above, the execution controller 209 refers to a detection result of the connection monitor 210. If a transmission destination of data, of which storing order is the earliest among the data stored from the non-volatile memory 204 to the data buffer 205, does not correspond to the initiator connected to the port 201, the execution controller 209 controls the transmission controller 211 to read data, of which transmission destination corresponds to the initiator connected to the port 201, out of the data buffer 205. And the execution controller 209 transmits the data.

In other words, the execution controller 209 controls the transmission controller 211 to read a first set of data, which is to be transmitted to the initiator 100 connected to the port 201, out of the data buffer 205, if the execution controller 209 determined that the identifier is not associated with a second set of data in the data buffer 205, which is to be transmitted prior to the other data in the data buffer 205. The other data includes the first set of data. The execution controller 209 controls the transmission controller 211 to transmit the first set of data. Thereby, the data transmission efficiency of the memory system 200 can be increased.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system, comprising:
  a nonvolatile memory;
  a data buffer in which data read out from the nonvolatile memory are stored prior to transmission to at least one of a plurality of initiators; and
  a controller circuit configured to manage a command-execution list that stores a list of commands received from the initiators, the commands each being associated with data that is stored in the data buffer and has a size greater than a threshold transmission amount, the controller circuit including a plurality of ports to communicate with one of the initiators and a plurality of command-execution circuits, each of which is dedicated to one of the ports and configured to execute one command that is one of the commands stored in the command-execution list, wherein
  when one of the ports is connected to a second initiator at a time (A) the amount of first data associated with a first command received from a first initiator and stored in the data buffer for transmission through the one port is greater than the threshold transmission amount and the amount of second data associated with a second command received from the second initiator and stored in the data buffer for transmission through the one port is greater than the threshold transmission amount, the second initiator being different from the first initiator, (B) the amount of the first data in the data buffer became greater than the threshold transmission amount before the amount of the second data in the data buffer became greater than the threshold transmission amount, and (C) a command-execution circuit dedicated to the one port is in a state to execute the first command, the controller circuit (a) searches the command-execution list and finds the second command in the command-execution list, and (b) instructs the command-execution circuit dedicated to the one port to be in a state to execute the second command.

2. The memory system according to claim 1, wherein when the one port is connected to no initiator at a time both the amount of the first data stored in the data buffer and the amount of the second data stored in the data buffer become greater than the threshold transmission amount, the controller circuit transmits a connection request through the one port to the first initiator.

3. The memory system according to claim 2, wherein when the one port is connected to the first initiator in response to the connection request, the controller circuit transmits the first data through the one port to the first initiator.

4. The memory system according to claim 1, wherein each of the ports is connected with an initiator through an expander.

5. The memory system according to claim 1, wherein each of the ports is configured to conform to Serial Attached SCSI (SAS) protocol.

6. The memory system according to claim 1, wherein the controller circuit further includes:

a counter configured to separately count for each of the ports the number of data units transmitted through said each of the ports, wherein data requested through a port that has the lowest counted number are selected to be read out from the nonvolatile memory and stored in the data buffer next.

7. The memory system according to claim 1, wherein the controller circuit further includes:

a counter configured to separately count for each of the ports the number of data units stored in the data buffer for transmission through said each of the ports, wherein data requested through a port that has the lowest counted number are selected to be read out from the nonvolatile memory and stored in the data buffer next.

8. The memory system according to claim 1, wherein the threshold transmission amount corresponds to the amount of data requested by one read command.

9. The memory system according to claim 1, wherein when one of the ports is connected to no initiator, the controller circuit searches the command-execution list to find an oldest command which was stored in the command-execution list earlier than any other commands which are currently stored in the command-execution list, instructs the command-execution circuit dedicated to the one port to be in a state to execute the oldest command, and transmits a connection request through the one port to an initiator to execute the oldest command.

* * * * *